Dec. 29, 1936.  J. F. LEE ET AL  2,066,114
ELECTRICAL SYSTEM FOR THE REMOTE INDICATION OF INSTRUMENT READINGS
Filed Dec. 7, 1931   3 Sheets-Sheet 1
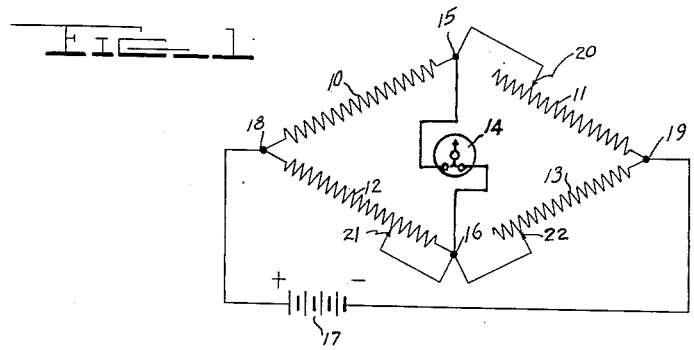
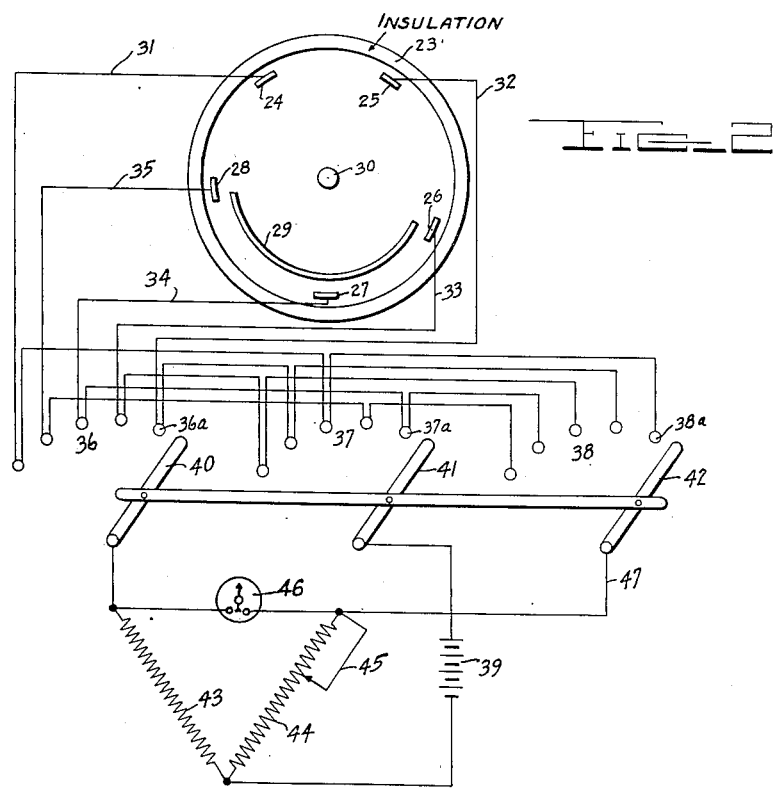
Inventors
Joseph F. Lee
Joseph Giarratana
By
Robert A. Lavender
Attorney

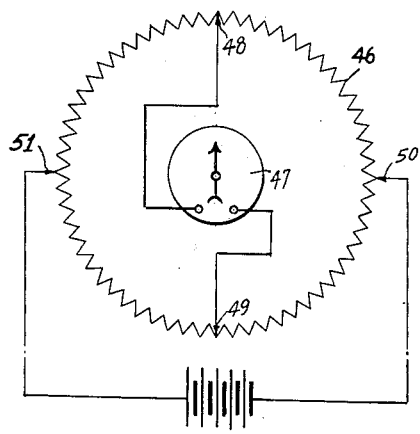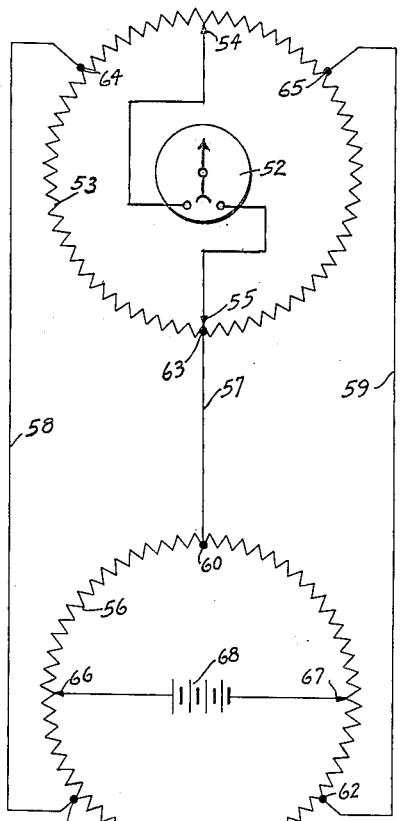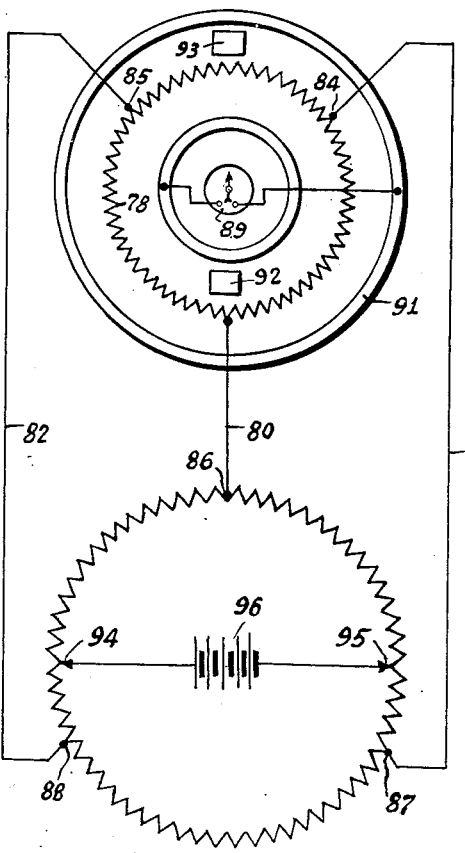

Dec. 29, 1936.  J. F. LEE ET AL  2,066,114
ELECTRICAL SYSTEM FOR THE REMOTE INDICATION OF INSTRUMENT READINGS
Filed Dec. 7, 1931   3 Sheets-Sheet 3
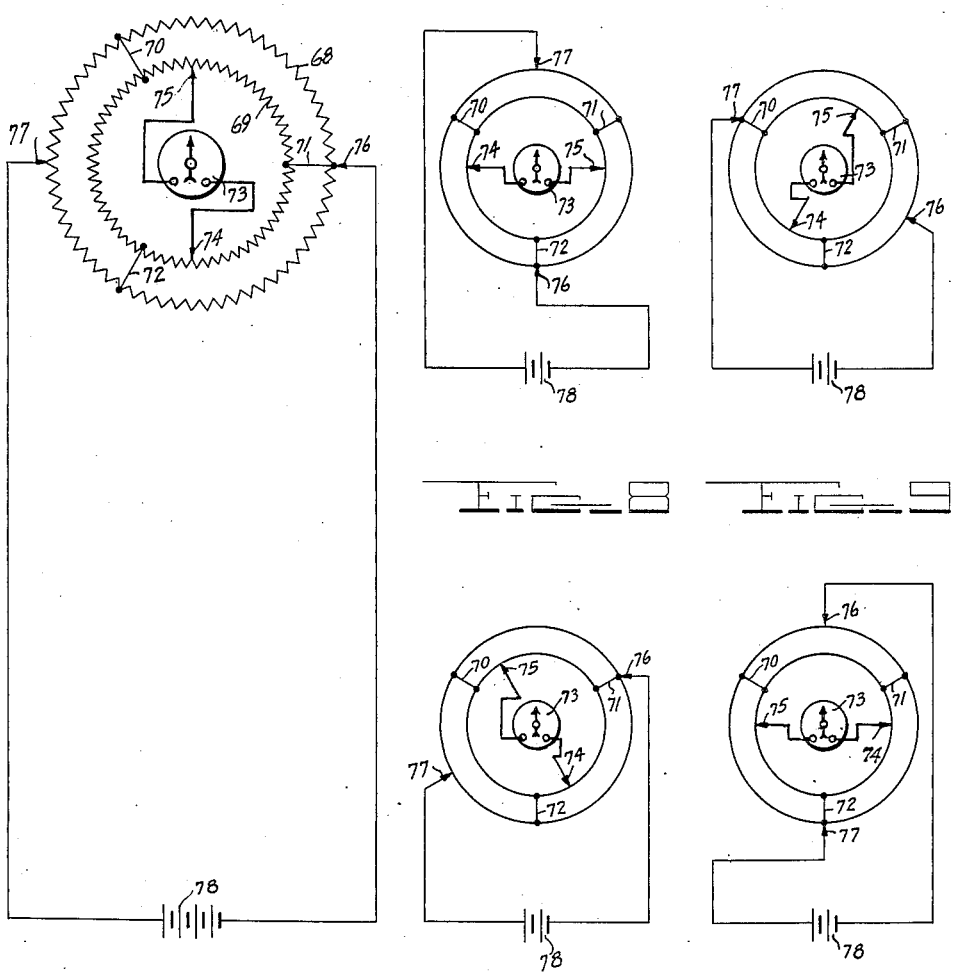
Inventors
Joseph F. Lee
Joseph Giarratana
By
Robert A. Lavender
Attorney Patented Dec. 29, 1936

2,066,114

UNITED STATES PATENT OFFICE 2,066,114

ELECTRICAL SYSTEM FOR THE REMOTE INDICATION OF INSTRUMENT READINGS

Joseph F. Lee, Washington, D. C., and Joseph Giarratana, New York, N. Y.

Application December 7, 1931, Serial No. 579,632

5 Claims. (Cl. 177—351)

This invention relates to a sensitive means for indicating at a distance the reading of an instrument and particularly to one that utilizes the principle of the Wheatstone bridge.

It is the object of our invention to provide a device for the purpose mentioned that will be substantially frictionless and hence offer no impediment to the operation of the instrument of which the readings are to be shown at a distance, that will not set up electrostatic or electromagnetic fields that would disturb the instrument, that will not in any way damp the movement of the parts of the instrument, and that will not be seriously affected in its accuracy of operation by moderate changes in the position of the instrument about an axis through the instrument.

A number of embodiments of our invention that will fulfill all the enumerated requirements are shown in the accompanying drawings, in which:

Fig. 1 is a diagrammatic representation of a Wheatstone bridge;

Fig. 2 shows diagrammatically the application of our invention to a magnetic compass;

Fig. 3 shows a modification of the Wheatstone bridge applicable to our invention;

Figs. 4 and 5 show modifications of the Wheatstone bridge applicable to our invention;

Figs. 6, 7, 8 and 9 show various positions of the parts for balancing the bridge disclosed in Fig. 5.

Fig. 10 is a form of our invention embodying certain features from each of the modifications shown in Figs. 2 and 4.

The principle of the Wheatstone bridge is illustrated in Fig. 1 in which the electrical conducting elements 10 and 11 are connected in series, as are conducting elements 12 and 13, and the two series circuits are connected in parallel with each other. A galvanometer 14 is connected to the point of connection 15 between 10 and 11 and to point 16 between 12 and 13. A battery 17 is connected to points 18 and 19 at which the two series circuits are connected to each other. Movable contacts 20, 21 and 22 provide for varying the resistances of elements 11, 12 and 13 respectively. When the electric potential of points 15 and 16 is the same, which is the condition when the ratio of the resistance of 10 to that of 11 equals the ratio of the resistance of 12 to 13, no current will flow through galvanometer 14. Conversely, deflection of the needle of the galvanometer indicates that the potentials at points 15 and 16 are not the same and therefore the ratio of the resistances above mentioned does not exist. Adjustment of one of the movable contacts to the proper position will restore the condition of balance, and the mechanism for moving the contact may be calibrated to give a reading which will show the extent of the lack of balance that existed.

While our invention is herein explained in connection with a magnetic compass its usefulness is not limited thereto, and the only limitation to be imposed on the scope thereof is defined in the appended claims.

In Fig. 2, 23 is the bowl of a compass in which is contained the liquid on which the compass card floats. The bowl is made of insulating material, while the liquid is a conductor of electricity. Fixed electrodes 24, 25, 26, 27 and 28 are substantially uniformly spaced in bowl 23. Movable vane 29 is rotatable about pivot 30 and is attached to the compass card (not shown) to move therewith. Vane 29 is of metal and is very light to not add appreciably to the inertia of the card.

Fixed contacts 24-28 are respectively connected by wires 31, 32, 33, 34 and 35 to contacts in groups 36, 37 and 38 through which the fixed contacts may be connected to battery 39 by means of the interconnected movable switch arms 40, 41 and 42. Battery 39 is connected to one terminal of each of resistances 43 and 44, the latter of which has a variable shunt 45, while galvanometer 46 is connected across the other ends of the resistances and to switch arm 42 by wire 47.

Ignoring for the moment the influence of vane 29, it will be seen that when arms 40, 41 and 42 are correspondingly in contact with any of the members of the groups 36, 37 and 38 a Wheatstone bridge will be formed through the liquid in bowl 23. For example, if the arms make a circuit through the contacts 36a, 37a and 38a, the liquid between electrodes 24 and 27 will form the arm of the bridge in series with resistance 44, while that between 25 and 27 will have a like relation to resistance 43. The liquid between electrodes 24 and 25 acts as a high resistance shunt around the galvanometer 46 but exerts no influence on the balance of the bridge.

Considering now the vane 29 in the position shown in Fig. 2, it will be seen that the current from electrodes 24 and 25 will pass to the respective adjacent ends of the vane, and through the vane to electrode 27. Since the ends of the vane are equidistant from each of the electrodes 24 and 25, the current through each will be equal to that through the other and the bridge will be balanced.

If, now, vane 29 be rotated, say clockwise, the electrical path through the liquid from electrode 24 to vane 29 and consequently to electrode 27 is shortened, while that from electrode 25 to electrode 27 is increased, which results in unbalancing of the bridge and flow of current through galvanometer 46. The direction and magnitude of the deflection of the needle of the galvanometer by that current will correspond directly to the direction and degree of rotation of vane 29, so that galvanometer 46 may be calibrated to show the angular sense and magnitude of the rotation of vane 29.

The compass bowl 23 may be disposed in any place most desirable for utilization of space and freedom from magnetic and mechanical disturbance, and the remainder of the apparatus located where it will be most convenient for use, the wires 31, 32, 33, 34 and 35 being extended to connect the bowl to the switching mechanism.

The balance of the bridge may be restored after a movement of vane 29 from a balancing position by adjustment of the variable contact 45 which will change the resistance of resistor 44 to the proper value relative to resistance of the electrical path through the liquid in bowl in series with 44. The value of the resistance of 44 may be calibrated in terms of the position of vane 29 with respect to the electrodes in bowl 23, and hence of the position of the bowl itself. For the particular use herein described the value of the resistance of resistor 44 may be made to read in terms of degrees of deflection of the compass needle from the north-south line.

Five fixed electrodes in bowl 23 have been shown in Fig. 2, but it is obvious that any convenient number thereof may be employed instead.

Fig. 3 illustrates schematically the adaptation of an annular resistance to use in a Wheatstone bridge. Galvanometer 47 is connected to annular resistance 46 at diametrically opposite points by movable contacts 48 and 49. Contacts 50 and 51 which connect battery 52 to resistance 46 are movable, but are constrained to remain 180° apart. It is apparent that so long as contacts 48 and 49 occupy the same relative positions with respect to contacts 50 and 51 the potentials at the terminals of galvanometer will be equal and no current will flow, and further, that any displacement of either pair of contacts may be compensated by a like movement of the other pair, so that the balance will be restored.

Fig. 4 illustrates a modification of our invention using a continuous resistance like that in Fig. 3 applied to the remote reading of an instrument. Galvanometer 52 is connected to continuous resistance 53 through movable contacts 54 and 55 which must always lie at opposite ends of a diameter of resistance 53. A like resistance 56 is connected to resistance 53 by wires 57, 58 and 59 at points 60, 61 and 62 on the former and points 63, 64 and 65, respectively, on the latter. Resistance 56 is suitably disposed with respect to the instrument to be read so that contacts 66 and 67, at opposite ends of a diameter of the resistance are constrained to move according to the deflection of the index of the instrument to be read at a distance. Battery 68 is connected between contacts 66 and 67.

It is apparent that when the parts in Fig. 4 occupy the relative positions shown, the system will be balanced and no current will flow through the galvanometer 52. If, however, contacts 66 and 67 are shifted there will have to be an equal rotation of contacts 54 and 55 in the opposite angular sense to restore the balance and therefore the positions of these contacts are an indication of the position of contacts 66 and 67, the balancing adjustment being shown by zero deflection of the galvanometer needle.

Fig. 5 shows a more symmetrical arrangement of the elements of the bridge circuit disclosed in Fig. 4, in that the form illustrated has any given wire connecting points on the two resistances which occupy the same angular position rather than reversed as in Fig. 4. Resistances 68 and 69 are connected by wires 70, 71 and 72 so placed that if the resistances were placed to be concentric with each other, the wires would extend radially. The galvanometer 73 is mounted so that the contacts 74 and 75 thereof always divide the resistance 69 into two equal parts, and the contacts 76 and 77 of battery 78 divide resistance 68 into two equal parts. It is thus seen that rotation of the contacts 76 and 77 corresponding to deflection of the pointer of an instrument in connection with which this device may be used will unbalance the circuits so that a current will flow through galvanometer 73, but an equal angular movement of contacts 76 and 77 will restore the balance.

Figs. 6, 7, 8 and 9 illustrate the balancing positions of the contacts 76 and 77 of battery 78 for various locations of the galvanometer contacts 74 and 75. It will be observed in comparing Fig. 6 with Fig. 9, the battery contacts have been moved 180°, so that while the angular position of the galvanometer contacts is the same, they are interchanged in absolute position.

The form shown in Fig. 10 is a modified arrangement of the construction in Fig. 4. Continuous annular resistors 78 and 79 are connected by the three wires 80, 81 and 82 respectively connected to the points 83, 84 and 85 on resistor 78 and points 86, 87 and 88 on resistor 79. Instead of galvanometer 89 being connected directly to resistor 78, however, it is connected to metal rings 90 and 91. Movable metal electrodes 92 and 93 are connected to, but insulated from, the compass card or compass magnets to rotate therewith, the former between ring 90 and the resistor 78 and the latter between the resistor and ring 91, but do not at any time contact either of the rings or the resistor. Electrodes 92 and 93, rings 90 and 91 and resistance 78 are all immersed in the liquid in the compass bowl. Electrodes 92 and 93 shorten the electrical path through the liquid and cut down the resistance between the resistor 78 and rings 90 and 91 adjacent thereto, so that when they are moved from the balancing position shown they will cause current to flow through galvanometer 89 until the contacts 94 and 95 of battery 96 are set to restore the equality of potential at the connections of the meter with rings 90 and 91. This is because the ring 90 will tend to assume the potential of that portion of resistance 78 which is nearest to electrode 92 and ring 91 will be likewise affected by the voltage of the portion of the resistance nearest electrode 93, and if there is any difference of potential existing between the two portions of the resistance, a current will flow through the meter. Inspection of Fig. 10 shows that point 86 is midway between battery contacts 94 and 95 and therefore the potential of that point will equal one-half the drop between the contacts, and this will be substantially the potential of ring 90. The point 88 is one-sixth the distance between contact 94 and contact 95, as is the point 87 on the other side, therefore two-thirds of the potential drop in the circuit 94—88—85—84—87—95 will take place between points 85 and 84 or one-half the drop will take place between contact 94 and the position of electrode 93 and this electrode will consequently be at a potential equal to one-half the total drop between contacts 94 and 95. The potential of electrode 93 is substantially the same as that of ring 91 and consequently the two rings will be at the same potential and no current will flow through meter 89. In the same manner it can be shown that for any position of electrodes 92 and 93 there is a balancing position of battery contacts 94 and 95 and that the rotation of the battery contacts is in the opposite angular sense through an angle equal to the rotation of the electrodes to restore the balance.

It is to be understood that while the galvanometer is schematically shown as being located near the compass bowl in actual construction it will be located near the battery 96 so that the operator in adjusting the settings of the battery contacts may observe the meter to determine when balance is reached and that wires will connect the meter to the rings 90 and 91. Or, if desired, the battery may be connected to the rings 90 and 91 and the meter connected across resistance 79, but in this case the direction of rotation of the meter contacts to achieve a balance in the circuits will be in the opposite angular sense to the rotation of the electrodes 92 and 93. The adjusting device for moving contacts 94 and 95 will be calibrated to give directly the position of the electrodes, that is, the reading of the compass.

We claim:

1. A remote-reading device for instruments that include a movable index, comprising a member of said instrument adapted to contain liquid and made of insulating material, an electrically conducting liquid in said member, a plurality of uniformly spaced fixed electrodes in said member, an arcuate electrically conducting vane rotatably mounted in said member adjacent said electrodes and adapted to be connected to said index, two external resistor elements having one end of each connected to a common point, a galvanometer connected across the other ends of said elements, a variable shunt connected to one of said resistors, three groups of contacts, the number of contacts in each group being the same as the number of fixed electrodes, means connecting each of the electrodes to a contact in each group, each of the contacts to which each electrode is connected having a different relative position in its group, three interconnected switch arms so disposed that each of said arms may be moved into contact with the contacts of a group, means connecting one of said arms to a terminal of said galvanometer and other means connecting another of said arms to the other terminal thereof, and a source of electric current connected to the point of common connection of said resistors and to the third of said switch arms.

2. A remote-reading device for instruments that include a movable index, comprising a member of said instrument adapted to contain liquid and made of insulating material, an electrically conducting liquid in said member, a plurality of uniformly spaced electrodes in said member, a movable arcuate electrode in said member adapted to be connected to said index, two external resistor elements having one end of each connected to a common point, a device to indicate the existence or absence of electrical balance in the circuits, adjustable means to produce electrical balance in said circuits, means to connect selectively said fixed electrodes to said resistors and a source of current operatively connected to the said circuits.

3. A remote-reading device for instruments that include a movable index, comprising a member of said instrument adapted to contain liquid and made of insulating material, an electrically conducting liquid in said member, a plurality of uniformly spaced electrodes in said member, a movable arcuate electrode in said member adapted to be connected to said index, two external resistor elements having one end of each connected to a common point, a device to indicate the existence or absence of electrical balance in the circuits, adjustable means to produce electrical balance in said circuits, means to connect said fixed electrodes to said resistors and a source of current operatively connected to the said circuits.

4. A remote-reading device for instruments that include a movable index, comprising a member of said instrument adapted to contain liquid and made of insulating material, an electrically conducting liquid in said member, a plurality of uniformly spaced electrodes in said member, a movable arcuate electrode in said member of a length substantially twice the distance between any two adjacent ones of the aforesaid electrodes adapted to be connected to said index, two external resistor elements having one end of each connected to a common point, a device to indicate the existence or absence of electrical balance in the circuits, adjustable means to produce electrical balance in said circuits, means to connect selectively said fixed electrodes to said resistors and a source of current operatively connected to said circuits.

5. A remote-reading device for instruments that include a movable index, comprising a member of said instrument adapted to contain liquid and made of insulating material, an electrically conducting liquid in said member, a plurality of uniformly spaced electrodes in said member, a movable arcuate electrode in said member of a length substantially twice the distance between any two adjacent ones of the aforesaid electrodes adapted to be connected to said index, two external resistor elements having one end of each connected to a common point, a device to indicate the existence or absence of electrical balance in the circuits, adjustable means to produce electrical balance in said circuits, means to connect said fixed electrodes to said resistors and a source of current operatively connected to said circuits.

JOSEPH F. LEE.
JOSEPH GIARRATANA.